UNITED STATES PATENT OFFICE.

CARL HEIDENREICH, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

PARA-AMINOACETYL META-TOLUIDIN.

No. 902,150.   Specification of Letters Patent.   Patented Oct. 27, 1908.

Application filed March 10, 1908.   Serial No. 420,249.   (Specimens.)

*To all whom it may concern:*

Be it known that I, CARL HEIDENREICH, doctor of philosophy, chemist, citizen of the German Empire, residing at Vohwinkel, near Elberfeld, Germany, Kingdom of Prussia, have invented new and useful Improvements in Para-Aminoacetyl Meta-Toluidin, of which the following is a specification.

My invention relates to the production of the hitherto unknown acidylamino-toluidins having the formula:

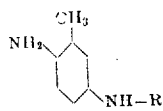

(R meaning an acidyl radicle) which are valuable intermediate compounds for the manufacture of dyestuffs.

The process for producing these compounds consists in first combining diazobenzene with meta-toluidin to produce benzene-azo-meta-toluidin, secondly treating this compound with acidylizing agents, such as acetic anhydrid, benzoyl chlorid etc., and finally treating the acidylized benzene-azo-meta-toluidins of the formula:

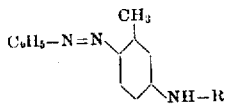

with reducing agents.

The new products are crystalline compounds soluble in water and easily soluble in alcohol, toluylendiamin

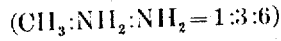

being formed by heating them with caustic alkalies.

In order to carry out my new process I can e. g. proceed as follows, the parts being by weight: 9.3 parts of anilin are diazotized in the usual manner by means of sodium nitrite and hydrochloric acid and to the diazo-compound 15 parts of meta-toluidin are added. When the reaction is complete the mixture is rendered alkaline by addition of caustic soda lye, and the excess of meta-toluidin is driven off with steam. After cooling the dyestuff solidifies. It is then heated to from 90 to 100° C. and mixed with 11 parts of acetic anhydrid while stirring. The reaction mass solidifies during cooling. It is pulverized and slowly stirred into a boiling mixture of 30 parts of iron filings with 50 parts of water. The reaction begins at once and is terminated by further boiling the mixture while stirring for 2 hours. When all the azo-compound has disappeared, steam is passed into the hot liquid, upon which anilin passes over. The remaining liquid is rendered alkaline by the addition of sodium carbonate and is separated from the iron by filtration. The new para-aminoacet-meta-toluidin is isolated by addition of common salt to the filtrate. It crystallizes from hot water in the shape of whitish crystals melting at 71° C., soluble in water, alcohol, ether and benzene. Amino-meta-toluidin is formed by heating it with caustic alkalies.

The formation of the new para-aminoacet-meta-toluidin takes place probably according to the following equations:

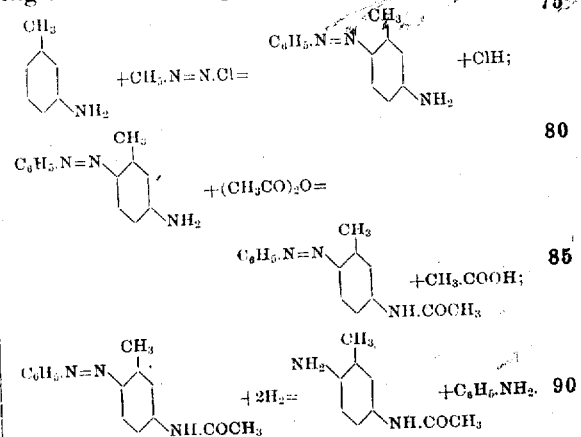

The process is carried out in an analogous manner for producing other para-aminoacidyl-meta-toluidins e. g. the para-aminobenzoyl-meta-toluidin (M. P. 154° C.) etc.

Having now described my invention and in what manner the same is to be performed, what I claim as new and desire to secure by Letters Patent is:—

1. The herein-described new para-aminoacidyl-meta-toluidins having the formula:

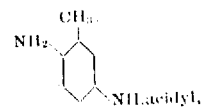

which compounds are crystalline powders soluble in water and easily soluble in alcohol; aminotoluidin ($CH_3:NH_2:NH_2 = 1:3:6$) being formed by heating them with caustic alkalies, substantially as described.

2. The herein-described new aminoacetyl-toluidin of the formula:

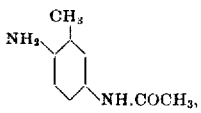

which is a whitish crystalline powder melting at 71° C., soluble in water, alcohol, ether and benzene; aminotoluidin ($CH_3:NH_2:NH_2 = 1:3:6$)

being formed by heating it with caustic alkalies, substantially as described.

In testimony whereof I have hereunto set my hand in the presence of two subscribing witnesses.

CARL HEIDENREICH. [L. S.]

Witnesses:
OTTO KÖNIG,
HEINR VIEHOFF.

---

It is hereby certified that in Letters Patent No. 902,150, granted October 27, 1908, upon the application of Carl Heidenreich, of Vohwinkel, near Elberfeld, Germany, for an improvement in "Para-Aminoacetyl Meta-Toluidin," an error appears in the printed specification requiring correction, as follows: In line 78, page 1, the formula "$+ CH_5 . N = N . Cl =$" should read $+ C_6H_5 . N = N . Cl =$ ; and that the said Letters Patent should be read with this correction therein that the same may conform to the record of the case in the Patent Office.

Signed and sealed this 17th day of November, A. D., 1908.

[SEAL.]

C. C. BILLINGS,

*Acting Commissioner of Patents.* which compounds are crystalline powders soluble in water and easily soluble in alcohol; aminotoluidin $(CH_3:NH_2:NH_2 = 1:3:6)$ being formed by heating them with caustic alkalies, substantially as described.

2. The herein-described new aminoacetyl-toluidin of the formula:

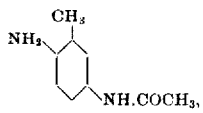

which is a whitish crystalline powder melting at 71° C., soluble in water, alcohol, ether and benzene; aminotoluidin $(CH_3:NH_2:NH_2 = 1:3:6)$ being formed by heating it with caustic alkalies, substantially as described.

In testimony whereof I have hereunto set my hand in the presence of two subscribing witnesses.

CARL HEIDENREICH. [L. S.]

Witnesses:
 OTTO KÖNIG,
 HEINR VIEHOFF.

---

It is hereby certified that in Letters Patent No. 902,150, granted October 27, 1908, upon the application of Carl Heidenreich, of Vohwinkel, near Elberfeld, Germany, for an improvement in "Para-Aminoacetyl Meta-Toluidin," an error appears in the printed specification requiring correction, as follows: In line 78, page 1, the formula "$+ CH_5 . N = N . Cl =$" should read $+ C_6H_5 . N = N . Cl =$ ; and that the said Letters Patent should be read with this correction therein that the same may conform to the record of the case in the Patent Office.

Signed and sealed this 17th day of November, A. D., 1908.

[SEAL.]

C. C. BILLINGS,

*Acting Commissioner of Patents.*

It is hereby certified that in Letters Patent No. 902,150, granted October 27, 1908, upon the application of Carl Heidenreich, of Vohwinkel, near Elberfeld, Germany, for an improvement in "Para-Aminoacetyl Meta-Toluidin," an error appears in the printed specification requiring correction, as follows: In line 78, page 1, the formula "$+ CH_5 . N = N . Cl =$" should read $+ C_6H_5 . N = N . Cl =$ ; and that the said Letters Patent should be read with this correction therein that the same may conform to the record of the case in the Patent Office.

Signed and sealed this 17th day of November, A. D., 1908.

[SEAL.]

C. C. BILLINGS,
*Acting Commissioner of Patents.*